United States Patent [19]

Tsuya et al.

[11] Patent Number: 4,925,738
[45] Date of Patent: May 15, 1990

[54] SUBSTRATE FOR A MAGNETIC DISK AND PROCESS FOR ITS PRODUCTION

[76] Inventors: Noboru Tsuya, 3-13-11 Hachimanyama, Setagaya-ku, Tokyo; Tadao Tokushima, 1-18-1 Izumi, Hamamatsu-shi, Shizuoka-ken; Toshiro Takahashi, 350-29 Ose-cho, Hamamatsu-shi, Shizuoka-ken, all of Japan

[21] Appl. No.: 250,088

[22] Filed: Sep. 28, 1988

[30] Foreign Application Priority Data

Sep. 30, 1987 [JP] Japan .................................. 62-248771

[51] Int. Cl.$^5$ .............................................. G11B 5/82
[52] U.S. Cl. ................................... 428/472.2; 428/694
[58] Field of Search .................... 204/37.6; 427/129; 428/472.2, 613, 694, 687, 609, 612, 141, 472

[56] References Cited

U.S. PATENT DOCUMENTS

| 4,650,708 | 3/1987 | Takahashi | 204/37.6 |
| 4,659,606 | 4/1987 | Wada et al. | 428/694 |
| 4,761,330 | 8/1988 | Tokushima et al. | 428/694 |

FOREIGN PATENT DOCUMENTS

| 62-38543 | 2/1987 | Japan | 428/694 |
| 63-136315 | 6/1988 | Japan | 428/694 |

Primary Examiner—John J. Zimmerman
Attorney, Agent, or Firm—Oblon, Spivak, McClelland, Maier & Neustadt

[57] ABSTRACT

A substrate for a magnetic disk, having an anodized aluminum coating layer with pores widened by chemical dissolution so that the total area of pores is from 20 to 80% of the entire surface area.

2 Claims, 2 Drawing Sheets

SUBSTRATE FOR A MAGNETIC DISK AND PROCESS FOR ITS PRODUCTION

BACKGROUND OF THE INVENTION

1. Field of the Invention

The present invention relates to a substrate for a magnetic disk suitable for high density recording and a process for its production.

2. Discussion of Background

Among various recording systems, the magnetic recording system is superior in the stability and the readiness for recording and reproduction and has been widely used. In recent years, however, there has been a strong demand for improvement of the recording density.

To meet the demand, $\gamma\text{-}Fe_2O_3$ having a coercive force at a level of 300 Oe and a high density recording material having a coercive force at a level of 600 Oe have been developed as magnetic recording media. Further, a thin film of Co-Ni alloy having a coercive force at a level of 1000 Oe has also been developed, whereby the linear recording density has reached to a level of 60 KBPI. Furthermore, a perpendicular magnetic recording system has been proposed, and it has been reported that a metallic thin film medium using a Co-Cr alloy provides a linear recording density of 300 KBPI.

Media using $\gamma\text{-}Fe_2O_3$ particles are widely practically used without problem with respect to the mechanical and chemical durability. However, metallic thin film media have problems with respect to the mechanical durability, etc., and they are not yet so commonly used.

Namely, a metallic thin film medium having a very smooth surface is likely to lead to sticking when brought in contact with a magnetic head. Further, a liquid lubricant applied to the medium is easily removed by the contact with the magnetic head, whereby the friction coefficient increases, thus leading to head crush. In order to avoid such problems, a mechanical texture method has been attempted in which scratch marks are mechanically imparted to the surface of the substrate by means of e.g. sand paper. However, it is very difficult to impart such scratch marks while controlling not to increase bit errors and not to cause the sticking to the magnetic head. Further, in the mechanically scratched texture, fine burrs exist on the surface, and they tend to peel off upon collision with the magnetic head and thus lead to head crush.

SUMMARY OF THE INVENTION

In view of the above problems, it is an object of the present invention to provide a substrate for a magnetic disk which is capable of preventing sticking to the magnetic head by forming an extremely thin air film having a uniform thickness between the medium surface and the magnetic head and which has the problem of mechanical durability solved by improving the retention of a lubricant. It has been found possible to accomplish this object by using an anodized aluminum coating film as the undercoating material of the substrate for the medium and widening the pores of the anodized aluminum coating layer to bring the total area of the pores to a prescribed proportion to the entire surface area so that proper roughness is provided on the surface of the medium prepared by forming a metallic thin film on the surface of the undercoating layer of the substrate.

Another object of the present invention is to provide a process for forming an aluminum coating layer having pores and pore depth so that the total area of the pores is in a proper proportion to the entire surface area with a view to the prevention of sticking to the magnetic head and the retention of a lubricant for a long period of time.

In its first aspect, the present invention provides a substrate for a magnetic disk, having an anodized aluminum coating layer with pores widened by chemical dissolution so that the total area of pores is from 20 to 80% of the entire surface area.

In its second aspect, the present invention provides a process for producing a substrate for a magnetic disk, which comprises forming an aluminum coating layer on a hard substrate, subjecting the aluminum coating layer to anodic oxidation treatment to form an anodized aluminum layer with pores, followed by chemical dissolution to widen the pores so that the total area of the pores becomes to be from 20 to 80% of the entire surface area.

DETAILED DESCRIPTION OF THE PREFERRED EMBODIMENTS

Figure 1:
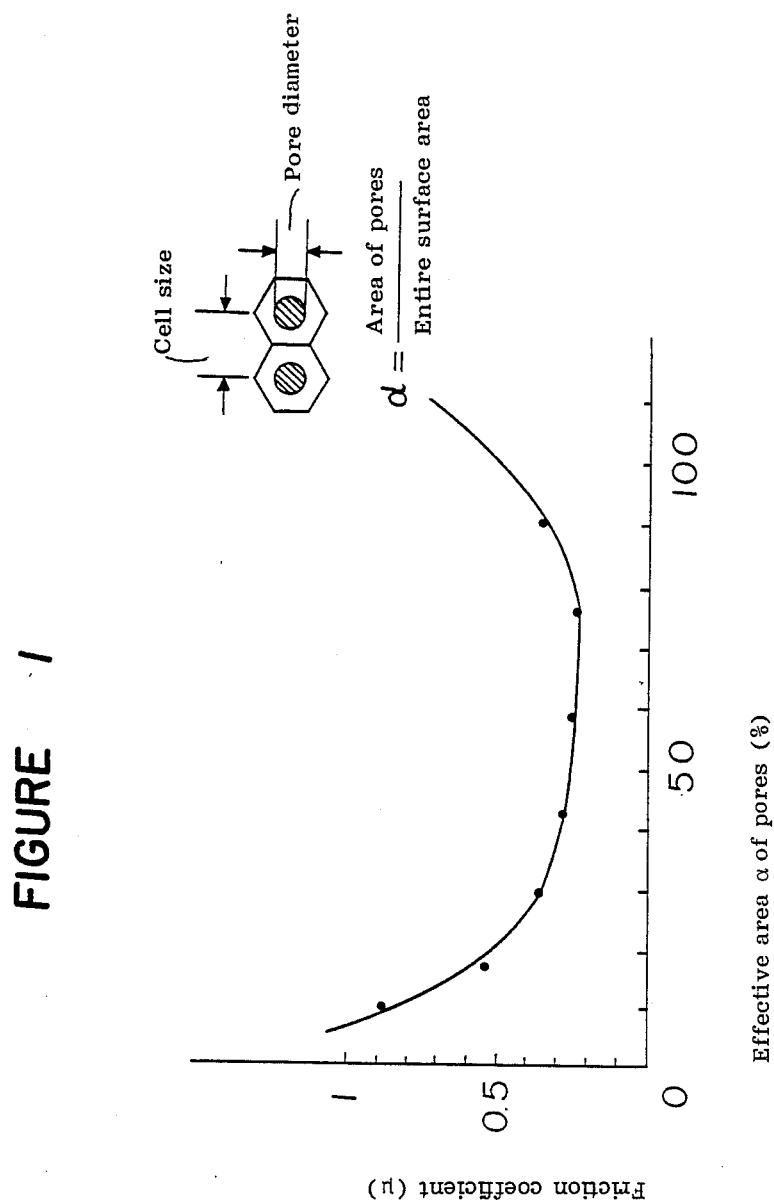
FIG. 1 is a graph showing the relation between the effective area of pores and the friction coefficient of the substrate surface.

The substrate for a magnetic disk according to the present invention is characterized in that the pores of an anodized aluminum coating layer were widened by dissolution so that the total area of pores constitutes from 20 to 80% of the entire surface area.

The process for producing a substrate for a magnetic disk according to the present invention is characterized in that an aluminum coating layer is formed on the surface of a hard substrate such as a glass plate or an aluminum alloy plate provided with an anodized aluminum coating layer, and the aluminum coating layer is then anodized, followed by chemical dissolution treatment to widen the pores so that the pore diameter is enlarged to bring the total area of the pores to a level of from 20 to 80% of the entire surface area and the depth of the pores is brought to a level of from 50 to 10,000 Å.

With the substrate for a magnetic disk according to the first aspect of the invention, an extremely thin air film is formed between the medium surface and the magnetic head, whereby the friction coefficient between the magnetic head and the medium is remarkably reduced. Especially when the depth of pores is selected suitably within a range of from 50 to 10,000 Å, the friction reducing effect is ensured, and the retention of a lubricant is improved so that the friction coefficient can be maintained at a low level for a long period of time.

The process for the production of the substrate for a magnetic disk according to the second aspect of the present invention is suitable for mass production since it is only required to conduct pore widening treatment in an electrolytic bath for dissolution after usual anodic oxidation treatment of aluminum by using the above-mentioned material and process, without requiring any special packing agent.

Now, the present invention will be described in further detail with reference to Examples. However, it should be understood that the present invention is by no means restricted by such specific Examples.

EXAMPLES

In a first step, an aluminum coating layer having a thickness of 1 μm was formed on the surface of a glass substrate by vacuum vapor deposition.

In a second step, the above substrate was subjected to anodic oxidation treatment in a 3% oxalic acid aqueous solution under an applied voltage of 50 V to form an anodized aluminum coating layer having a pore diameter of 370 Å, a cell size of 1100 Å and an effective area of pores of 9%.

In a third step, the above substrate was subjected to pore widening treatment by dipping the substrate in a 10% $H_3PO_4$ electrolyte at 30° C. for chemical dissolution.

By adjusting the treating time for the third step, 6 samples having various effective areas of pores as shown in Table 1 were obtained.

TABLE 1

| Sample No. | 1 | 2 | 3 | 4 | 5 | 6 |
|---|---|---|---|---|---|---|
| Treating time (min.) | 0 | 20 | 40 | 60 | 80 | 100 |
| Pore diameter (Å) | 340 | 480 | 600 | 750 | 870 | 1000 |
| Effective area (%) | 9 | 17 | 27 | 42 | 57 | 75 |

FIG. 1 shows the change in the friction coefficient when the pore diameter was changed to change the effective area of pores while maintaining the cell size to be constant, as mentioned above.

For the measurement of the friction coefficient, a substrate having a carbon coating layer of 200 Å applied after the pore widening treatment to harden the substrate surface was used. The friction coefficient in the case where a liquid lubricant is applied to the substrate surface having enlarged pores showed a constant value of 0.2 irrespective of the effective area of pores, and the line connecting the measured values became a horizontal straight line.

As is evident from FIG. 1, the friction coefficient increases if the effective area of pores is less than 20%. This is because the sticking force of the medium to the magnetic head increases. Further, if the effective area of pores exceeds 80%, the substrate surface tends to be brittle, whereby the friction coefficient, likewise increases.

Figure 2:
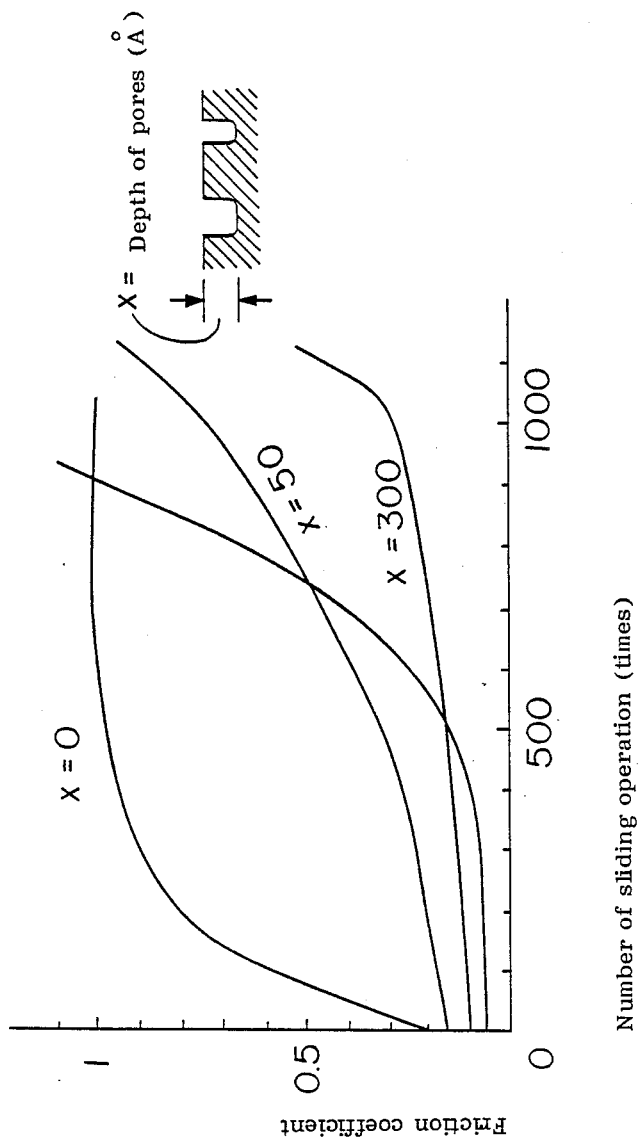
FIG. 2 is a graph showing the relation between the depth of pores and the friction coefficient.

By adjusting the electrolytic voltage for the above pore widening treatment, the pore depth was varied, and the relation between the various pore depths and the friction coefficients was investigated. For the measurement, a substrate having a carbon coating layer of 200 Å on its surface and a magnetic head made of Mn-Zn alloy having a weight of 15 g were used. The results of the measurement are shown in FIG. 2.

As is evident from the Figure, the friction reducing effect appears at a level of about 50 Å. If the depth of pores exceeds 10,000 Å, the friction coefficient tends to increase again since dusts, etc. are likely to enter the pores. Further, when the depth of pores exceeds 500 Å, bit errors tend to increase. For this reason, the depth of pores is preferably from 50 to 500 Å.

In the above Examples, the coating layer was formed by vapor deposition of aluminum on the surface of a glass plate, and this represents merely one example of the hard substrate and the method for forming an aluminum coating layer. As the hard substrate, an aluminum alloy plate may be employed. Further, for the formation of an aluminum coating layer, sputtering or any other known methods may be employed.

As mentioned above, one of the objects of the present invention is to overcome the problem of magnetic head crush due to the presence of burrs in the case of the conventional mechanical texture method. From this viewpoint, the physicochemical properties of the anodized aluminum coating layer are utilized. Namely, by virtue of the smoothness of the coating layer surface, head crush is prevented, while the pores are widened by dissolution to adjust the effective area of the pores to a proper level so that the friction coefficient is reduced by the presence of an extremely thin air film. From this viewpoint, for the aluminum coating layer of the substrate of the present invention, it is ideal to use an aluminum coating layer having a (111) crystal face as the predominant face. The (111) face is most excellent in the surface precision. Accordingly, when an aluminum coating layer having such a (111) face as the predominant face is used for the substrate, the smoothness of the surface will be excellent, whereby the problem of the head crush will be completely solved.

A magnetic disk is prepared by depositing a magnetic material of Co-Cr alloy or Co-Ni alloy on the substrate surface after the pore widening treatment, by sputtering or plating. Such a metallic thin film grows following the surface roughness of the substrate, whereby the texture structure provided by the pores is maintained.

As described in the foregoing, according to the present invention, the texture is obtained by controlling the proportion of the area of pores on the surface of the anodized aluminum coating layer, and it is free from burrs as existing in the conventional mechanical texture, whereby dust formation is minimum and head crush scarecely takes place.

What is claimed is:

1. A magnetic disk, comprising:
   a substrate and a metallic thin magnetic film formed thereon, said substrate having an anodized aluminum layer thereon formed from coated aluminum having a (111) crystal face as the predominant face of the coated aluminum layer, with the pores of the anodized layer being widened by dissolution so that the total area of pores ranges from 20 to 80% of the entire surface area.

2. The magnetic disk according to claim 1, wherein the pores have a depth of from 50 to 10,000 Å.

* * * * *